(12) United States Patent
Yoshida

(10) Patent No.: US 10,964,062 B2
(45) Date of Patent: Mar. 30, 2021

(54) SKIN EVALUATION DEVICE, SKIN EVALUATION METHOD, AND SKIN EVALUATION PROGRAM

(71) Applicant: FUJIFILM Corporation, Tokyo (JP)

(72) Inventor: Naoko Yoshida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 191 days.

(21) Appl. No.: 15/920,988

(22) Filed: Mar. 14, 2018

(65) Prior Publication Data

US 2018/0204353 A1 Jul. 19, 2018

Related U.S. Application Data

(63) Continuation of application No. PCT/JP2016/077037, filed on Sep. 14, 2016.

(30) Foreign Application Priority Data

Sep. 29, 2015 (JP) .............................. JP2015-190652

(51) Int. Cl.
*G06K 9/00* (2006.01)
*G06T 7/90* (2017.01)
(Continued)

(52) U.S. Cl.
CPC .............. *G06T 7/90* (2017.01); *G01N 21/27* (2013.01); *G01N 21/31* (2013.01); *G06T 7/0004* (2013.01);
(Continued)

(58) Field of Classification Search
CPC ........................................................ G06T 7/90
(Continued)

(56) References Cited

U.S. PATENT DOCUMENTS

2002/0126897 A1* 9/2002 Ueda ................. G06K 9/00335
382/197
2009/0253162 A1 10/2009 Windsor et al.
(Continued)

FOREIGN PATENT DOCUMENTS

CN 103077541 A 5/2013
CN 104688180 A 6/2015
(Continued)

OTHER PUBLICATIONS

"Evaluation and analysis for spectral reflectance imaging of human skin" by Kenji et al. (Year: 2005).*
(Continued)

*Primary Examiner* — Stephen P Coleman
(74) *Attorney, Agent, or Firm* — Sughrue Mion, PLLC

(57) ABSTRACT

An applied state of a cosmetic material on skin is easily and accurately evaluated. A principal component analysis unit 4 performs principal component analysis on a spectral reflectance measured from a spectral image and calculates eigenvectors of first to third principal components and principal component scores of the first to third principal components based on the eigenvectors of the first to third principal components, and a skin evaluation unit 5 evaluates an applied state of a cosmetic material on skin using at least one of the calculated principal component scores of the first to third principal components and a preset threshold value or a discriminant function of each principal component.

8 Claims, 10 Drawing Sheets
(2 of 10 Drawing Sheet(s) Filed in Color)

(51) Int. Cl.
  *G01N 21/27*  (2006.01)
  *G01N 21/31*  (2006.01)
  *G06T 7/00*  (2017.01)

(52) U.S. Cl.
  CPC .... *G06T 7/0012* (2013.01); *G01N 2201/1293* (2013.01); *G06T 2207/10024* (2013.01); *G06T 2207/20072* (2013.01); *G06T 2207/30088* (2013.01)

(58) Field of Classification Search
  USPC .......................................................... 382/162
  See application file for complete search history.

(56) References Cited

U.S. PATENT DOCUMENTS

| | | | | |
|---|---|---|---|---|
| 2013/0258366 | A1* | 10/2013 | Miyazaki | B41F 33/0036 358/1.9 |
| 2014/0206957 | A1 | 7/2014 | Tseng et al. | |
| 2015/0145884 | A1* | 5/2015 | Jang | G01J 3/0264 345/603 |
| 2016/0091980 | A1* | 3/2016 | Baranski | A61B 5/0488 345/156 |

FOREIGN PATENT DOCUMENTS

| | | |
|---|---|---|
| JP | 2002-170120 A | 6/2002 |
| JP | 2014-093043 A | 5/2014 |
| JP | 2015-005281 A | 1/2015 |
| JP | 5650012 B2 | 1/2015 |
| WO | 2014/204007 A1 | 12/2014 |

OTHER PUBLICATIONS

Homepage of Kanebo Cosmetics, Inc., News Release on Jun. 28, 2010, of a Technical Announcement Report "Success in development of a new technology for identifying a finished state of foundation and performing conversion into an image 'Foundation Quantitation and Distribution Measurement System,'" 3 pages.
International Search Report of PCT/JP2016/077037 dated Dec. 13, 2016.
Written Opinion of the International Searching Authority dated Dec. 13, 2016, in counterpart International Application No. PCT/JP2016/077037.
International Preliminary Report on Patentability dated Apr. 3, 2018, in counterpart International Application No. PCT/JP2016/077037.
Communication dated Jul. 3, 2020, from the State Intellectual Property Office of the P.R.C in application No. 201680056882.0.

* cited by examiner

SKIN EVALUATION DEVICE, SKIN EVALUATION METHOD, AND SKIN EVALUATION PROGRAM

CROSS-REFERENCE TO RELATED APPLICATIONS

This application is a Continuation of PCT International Application No. PCT/JP2016/077037 filed on Sep. 14, 2016, which claims priority under 35 U.S.C § 119(a) to Japanese Patent Application No. 2015-190652 filed on Sep. 29, 2015. Each of the above application(s) is hereby expressly incorporated by reference, in its entirety, into the present application.

BACKGROUND OF THE INVENTION

1. Field of the Invention

The present invention relates to a skin evaluation device, a skin evaluation method, and a skin evaluation program, and more particularly, to a skin evaluation device, a skin evaluation method, and a non-transitory computer readable recording medium storing a skin evaluation program for evaluating an applied state of cosmetic materials on the basis of a captured image obtained by imaging a face of a subject with applied makeup.

2. Description of the Related Art

A foundation can hide color irregularities, spots, pores, pimples, or the like of skin and can prepare beautify texture of the skin when an appropriate amount of the foundation is applied to the skin. However, depending on the amount of adhesion of the foundation to the skin, the foundation may not be able to cover the spots or the pores or may make the texture of the skin worse.

Therefore, in the development of cosmetics, it is very important to recognize the amount of adhesion of a cosmetic material to the skin or a position of the adhesion of the cosmetic material. Therefore, a method of recognizing a site of adhesion or the amount of the adhesion of the foundation has been proposed in the beauty industry.

For example, in Homepage of Kanebo Cosmetics, Inc., News Release on Jun. 28, 2010, of a Technical Announcement Report "Success in development of a new technology for identifying a finished state of foundation and performing conversion into an image "Foundation Quantitation and Distribution Measurement System"" (http://www.kanebo-cosmetic materials.co.jp/company/pdf/20100628-01.pdf), a method of measuring the amount of application of a foundation adhered to skin or a distribution status of the foundation from an image captured using an optical filter for emphasizing small differences in color tone between bare skin and skin in a state in which the foundation is applied has been proposed.

SUMMARY OF THE INVENTION

However, in the method of Homepage of Kanebo Cosmetics, Inc., News Release on Jun. 28, 2010, of a Technical Announcement Report "Success in development of a new technology for identifying a finished state of foundation and performing conversion into an image "Foundation Quantitation and Distribution Measurement System"" (http://www.kanebo-cosmetic materials.co.jp/company/pdf/20100628-01.pdf), in order to recognize a difference in color tone between bare skin and skin in a state in which a foundation is applied, design and development of an optical filter that selectively transmits light in a specific wavelength region for emphasizing the differences are necessary, and measurement cannot be performed unless imaging is not performed using this optical filter. Thus, the measurement cannot be easily performed.

The present invention has been made to solve such problems in the related art, and an object of the present invention is to provide a skin evaluation device, a skin evaluation method, and a non-transitory computer readable recording medium storing a skin evaluation program capable of accurately evaluating an applied state of cosmetic materials to facial skin or the like.

A skin evaluation device according to the present invention comprises an image input unit that receives a spectral image obtained by imaging skin of a subject; a spectral reflectance calculation unit that measures a spectral reflectance from at least a portion of the spectral image; a principal component analysis unit that performs principal component analysis on the spectral reflectance and calculates eigenvectors of first to third principal components and principal component scores of the first to third principal components based on the eigenvectors of the first to third principal components; and a skin evaluation unit that evaluates an applied state of a cosmetic material in the skin using at least one of the calculated principal component scores of the first to third principal components and a preset threshold value or discriminant function of each principal component.

Here, it is preferable that the eigenvector of the first principal component represents brightness of the skin, the eigenvector of the second principal component has a reflectance difference between a short wavelength band and a long wavelength band, and the third principal component has a reflectance difference between a reflectance near a central wavelength of 550 nm and a reflectance near a central wavelength of 500 nm and between the reflectance near the central wavelength of 550 nm and a reflectance near a central wavelength of 600 nm.

It is preferable that the skin evaluation unit evaluates whether the skin is bare skin or in a state in which a cosmetic material is applied using the principal component score of the third principal component calculated by the principal component analysis unit and the preset threshold value or discriminant function of the third principal component.

It is preferable that the skin evaluation unit evaluates the amount of application of the cosmetic material using the principal component score of the third principal component calculated by the principal component analysis unit and the preset threshold value or discriminant function of the third principal component.

It is preferable that the skin evaluation unit evaluates an elapsed time after the cosmetic material is applied to the bare skin using the principal component scores of the second and third principal components and the preset threshold values or discriminant functions of the second and third principal components.

The skin evaluation device can further comprise a database that stores the eigenvectors of the first to third principal components calculated by the principal component analysis unit, and the principal component analysis unit can also calculate principal component scores of the first to third principal components by referring to the eigenvectors of the first to third principal components stored in the database.

The database can store the preset threshold values or discriminant functions of the first to third principal components, and the skin evaluation unit can evaluate an applied state of the cosmetic material in the skin using at least one of the principal component scores of the first to third principal components calculated by the principal component analysis unit and the preset threshold values or discriminant functions of the first to third principal components stored in the database.

A skin evaluation method according to the present invention is a method of receiving a spectral image obtained by imaging skin of a subject; measuring a spectral reflectance from at least a portion of the spectral image; performing principal component analysis on the spectral reflectance and calculating eigenvectors of first to third principal components and principal component scores of the first to third principal components based on the eigenvectors of the first to third principal components; and evaluating an applied state of a cosmetic material on the skin using at least one of the calculated principal component scores of the first to third principal components and a preset threshold value or discriminant function of each principal component.

A non-transitory computer readable recording medium storing a skin evaluation program according to the present invention is a skin evaluation program for causing a computer to execute the steps of: receiving a spectral image obtained by imaging skin of a subject; measuring a spectral reflectance from at least a portion of the spectral image; performing principal component analysis on the spectral reflectance and calculating eigenvectors of first to third principal components and principal component scores of the first to third principal components based on the eigenvectors of the first to third principal components; and evaluating an applied state of a cosmetic material on the skin using at least one of the calculated principal component scores of the first to third principal components and a preset threshold value or discriminant function of each principal component.

According to the present invention, it is possible to easily and accurately evaluate the applied state of the cosmetic materials on the skin of the subject.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5A is a diagram illustrating separation evaluation between bare skin and skin with applied makeup, FIG. 5B is a diagram illustrating the evaluation of the amount of application of a cosmetic material, and FIG. 5C is a diagram illustrating evaluation of temporal prediction of skin with applied makeup.

DESCRIPTION OF THE PREFERRED EMBODIMENTS

Hereinafter, embodiments of the present invention will be described below with reference to the accompanying drawings.

Figure 1:
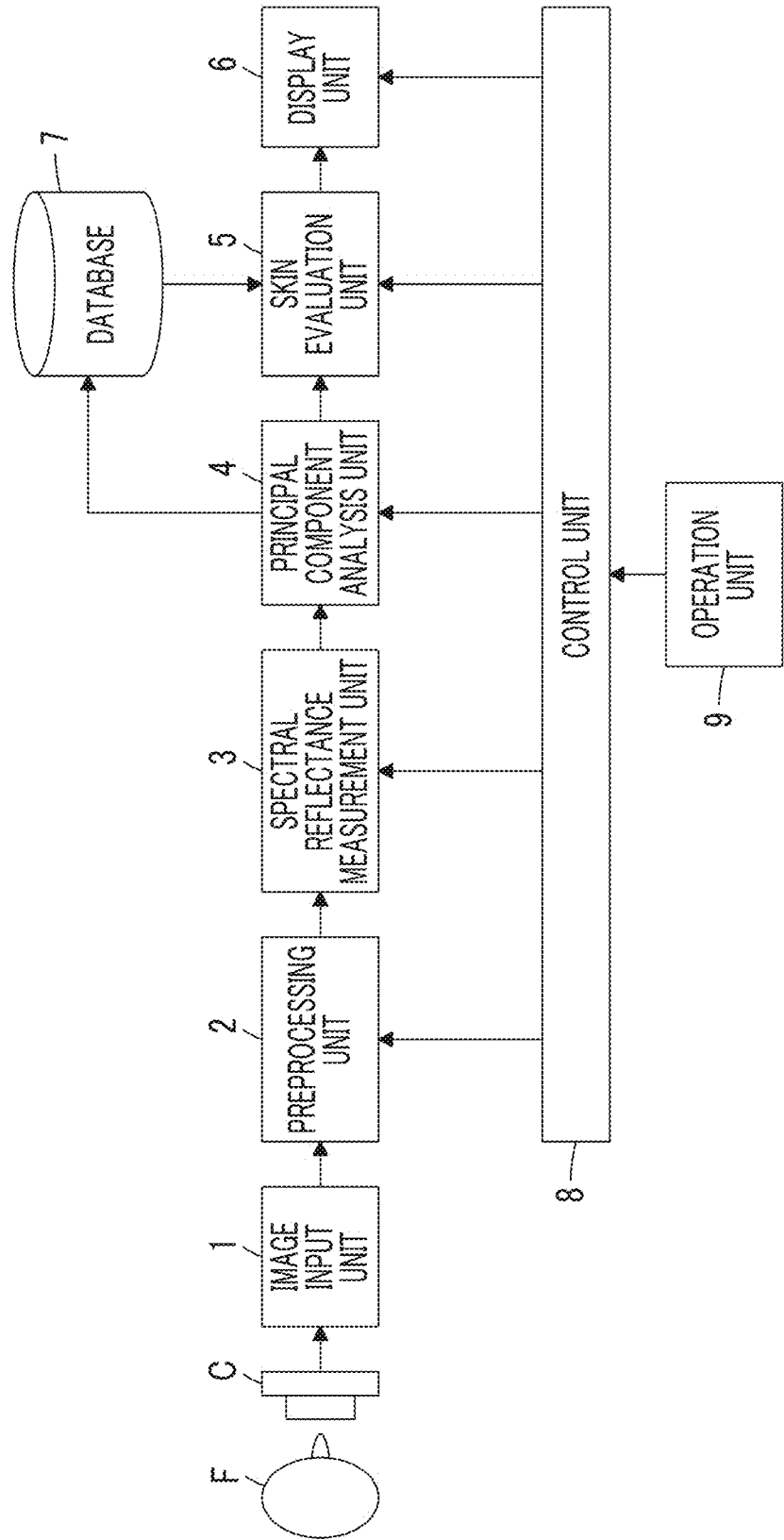
FIG. 1 is a block diagram illustrating a configuration of a skin evaluation device that evaluates an applied state of a cosmetic material according to Embodiment 1 of the present invention.

FIG. 1 illustrates a configuration of a skin evaluation device according to an embodiment of the present invention. The skin evaluation device evaluates a state of a skin of a face F of a subject, that is, an applied state of a cosmetic material using a captured image obtained by imaging bare skin or the face F of the subject with applied makeup using a camera C, and includes an image input unit 1 connected to the camera C. A preprocessing unit 2, a spectral reflectance measurement unit 3, a principal component analysis unit 4, a skin evaluation unit 5, and a display unit 6 are sequentially connected to the image input unit 1. Further, a reference database 7 is connected to the skin evaluation unit 5. Further, a control unit 8 is connected to the spectral reflectance measurement unit 3, the principal component analysis unit 4, and the skin evaluation unit 5, and an operation unit 9 is connected to the control unit 8.

The image input unit 1 receives a captured image from the camera C that has imaged the face F of the subject. Here, the captured image input from the camera C is a spectral image captured by a monochrome camera (that is, a camera C) with a color filter that selectively transmits a plurality of types of specific wavelength regions, which includes wavelengths corresponding to at least R (red), G (green), and B (blue). Further, the face F of the subject can be irradiated with light in an arbitrary wavelength range of at least three wavelengths at 380 nm to 780 nm (visible range) using a spectral light source, and an image captured by a monochrome camera can be used. The light in the arbitrary wavelength range includes wavelengths corresponding to R (red), G (green), and B (blue).

The skin of the face F of the subject may be skin with applied makeup (makeup skin) or may be bare skin. Further, the subject is not limited to the face F of the subject, but may be an arm or a skin replica.

The preprocessing unit 2 performs preprocessing such as light amount correction and noise removal on the captured image input from the image input unit 1.

The spectral reflectance measurement unit 3 measures a spectral reflectance on the basis of the spectral image (a reflection spectrum captured at intervals of 10 nm within a visible light range of 380 nm to 780 nm) input from the preprocessing unit 2. As a method of measuring the spectral reflectance, a known method can be used.

In this embodiment, the spectral reflectance is measured from the spectral image, but the present invention is not limited thereto. For example, a spectral reflectance of facial skin of the subject may be directly measured using a spectral radiance meter (CS-2000 manufactured by Konica Minolta).

The spectral reflectance measured by the spectral reflectance measurement unit 3 is output to the principal component analysis unit 4.

The principal component analysis unit 4 performs principal component analysis on the spectral reflectance measured by the spectral reflectance measurement unit 3, and calculates first to third eigenvectors and respective principal component scores related to the first to third principal components.

The respective calculated principal component scores of the first to third principal components are output to the skin evaluation unit 5.

Here, the acquired first eigenvector of the first principal component represents brightness of the skin, and the second eigenvector of the second principal component has a reflectance difference between a short wavelength band and a long wavelength band, such as a reflectance difference of about 0.2% to 0.5%. The third eigenvector of the third principal component has a reflectance difference between a reflectance near a central wavelength of 550 nm and a reflectance near a central wavelength of 500 nm and between a reflectance near the central wavelength of 550 nm and a reflectance near a central wavelength of 600 nm, such as a reflectance difference of about 0.3 to 0.8%.

The database 7 stores the first to third eigenvectors related to the first to third principal components calculated by the principal component analysis unit 4, or a threshold value or a discriminant function to be used when skin evaluation is performed on the basis of the calculated principal component scores related to the first to third principal components. An example of the threshold value or the discriminant function may include a threshold for discriminating the bare skin and the skin with applied makeup on the basis of the principal component score of the third principal component, a threshold for evaluating the amount of application of the cosmetic material based on the principal component score of the third principal component, or a discriminant function for evaluating an elapsed time after application of the cosmetic material based on the principal component scores of the second principal component and the third principal component.

Here, as images that are used to acquire the first to third eigenvectors related to the first to third principal components, the threshold values, and the discriminant functions stored in the database 7 in advance, a plurality of types of (N-levels) subjects (skins) images with the different amounts of application of cosmetic material (foundation) are used as samples. The amount of application of the cosmetic material is preferably selected from 0.0 mg/cm$^2$ to 1.0 mg/cm$^2$ and 2 to 3 or more. For example, the spectral reflectances, the eigenvectors related to the first to third principal components, or the principal component scores can be measured from spectral images of the skin in a case where the amount of application of the cosmetic material includes nine types (nine levels), that is, 0 mg/cm$^2$ (bare skin), 0.05 mg/cm$^2$, 0.10 mg/cm$^2$, 0.15 mg/cm$^2$, 0.2 mg/cm$^2$, 0.4 mg/cm$^2$, 0.6 mg/cm$^2$, 0.8 mg/cm$^2$, and 1.0 mg/cm$^2$ and the threshold value for evaluating the skin with applied makeup can be arbitrarily set, or the discriminant function can be acquired, for example, through Fisher's linear discrimination analysis.

The discriminant function, for example, can be determined using a scheme of dividing two groups of data by a determination plane through the linear discrimination analysis.

determination plane $y_n$ can be expressed as $y_n = \vec{w} \cdot \vec{x}_n$. w is the amount representing a slope of the determination plane. Specifically, w of the determination plane is obtained using the following procedure. An inter-class covariance matrix (Sb) and intra-class covariance matrix (Sw) of 2 groups of data are obtained. A new matrix Sn is obtained from Sb and Sw, as shown in the following equation.

$$Sn = Sw^{-1} * Sb$$

The eigenvalue problem of Sn is solved and the eigenvector with a maximum eigenvalue is obtained. This eigenvector is a slope w in a determination plane of the linear discrimination analysis, and an equation indicating this determination plane is a discriminant function.

Further, not only skin of a face or a human arm but also skin replica can also be used as the subject used for such preprocessing, but it is preferable for human skin to be used when the threshold value or the discriminant function that is used to evaluate the elapsed time after application of the cosmetic material is obtained.

The skin evaluation unit 5 evaluates the skin of the subject by comparing the principal component scores of the first to third principal components calculated by the principal component analysis unit 4 with the threshold value stored in the database 7 or by using the discriminant function. Particularly, it is preferable that the discrimination between the bare skin and the skin with applied makeup is evaluated with the third principal component, the amount of application of the skin with applied makeup is evaluated with the third principal component, and temporal prediction of the skin with applied makeup is evaluated with the second principal component and the third principal component.

The result acquired by the skin evaluation unit 5 is output to the display unit 6.

The display unit 6 includes, for example, a display device such as a liquid crystal display (LCD), and displays the result of the evaluation related to the applied state of the cosmetic material evaluated by the skin evaluation unit 5.

The operation unit 9 is used for an operator to perform an information input operation, and can be formed using a keyboard, a mouse, a trackball, a touch panel, or the like.

The control unit 8 performs control of each unit in the skin evaluation device on the basis of, for example, various command signals input from the operation unit 9 by the operator.

The preprocessing unit 2, the spectral reflectance measurement unit 3, the principal component analysis unit 4, the skin evaluation unit 5, and the control unit 8 are configured by a central processing unit (CPU) and an operation program for causing the CPU to perform various processes, but these may be configured by a digital circuit. Further, a memory can be connected to the CPU via a signal line such as a bus. For example, the spectral image generated by the preprocessing unit 2, the spectral reflectance calculated by the spectral reflectance measurement unit 3, the eigenvectors and the principal component scores according to the first to third principal components calculated by the principal component analysis unit 4, and the evaluation result related to the applied state of the cosmetic material calculated by the skin evaluation unit 5 can be stored in the memory, and the image and the evaluation result related to the applied state of the cosmetic material stored in the memory can be displayed on the display unit 6 under the control of the control unit 8.

Figure 2:
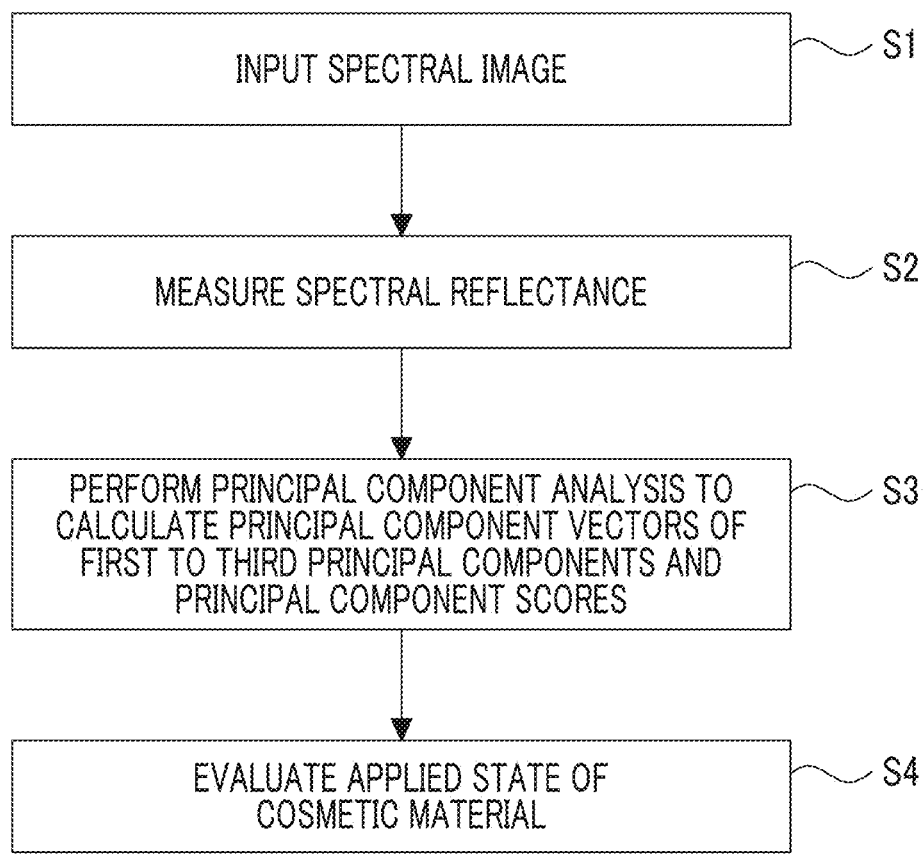
FIG. 2 is a diagram illustrating a flowchart of a skin evaluation method that is executed by the skin evaluation device according to Embodiment 1.

Next, an operation of the first embodiment will be described with reference to FIG. 2.

First, a spectral image obtained by imaging the face F of the subject using the camera C is input from the camera C to the preprocessing unit 2 via the image input unit 1 of the skin evaluation device, preprocessing such as light source correction and noise removal is performed on the spectral image, and then, the spectral image is input from the preprocessing unit 2 to the spectral reflectance measurement unit 3, as illustrated in FIG. 1 (step S1). The spectral reflectance measurement unit 3 measures a spectral reflectance on the basis of the input spectral image, and outputs the spectral reflectance to the principal component analysis unit 4 (step S2). Then, the principal component analysis unit 4 calculates the eigenvectors according to the first to third principal components from the spectral reflectance, calculates the principal component scores on the basis of the respective eigenvectors, and inputs the eigenvectors and the principal component scores to the skin evaluation unit 5 (step S3). The skin evaluation unit 5 performs prediction of an applied state of the cosmetic material, that is, discrimination between the bare skin and skin with applied makeup, evaluation of the amount of application of cosmetic material, or an elapsed time after the application of cosmetic material on the basis of the calculated principal component scores related to the first to third principal components using the threshold value or the discriminant function stored in the database 7 (step S4).

The skin evaluation as in the above embodiment can be executed by causing a computer including input means, a CPU, and a memory to function using a skin evaluation program. That is, by causing the computer to function using the skin evaluation program, the image input unit 1 acquires a captured image of the face of the subject, and the CPU executes the preprocessing unit 2, the spectral reflectance measurement unit 3, the principal component analysis unit 4, and the skin evaluation unit 5 on the basis of the acquired captured image to perform the skin evaluation of the subject.

In the present embodiment, the skin evaluation is performed using the spectral image, but the skin evaluation can also be performed using an RGB image (Red, Green, and Blue image) captured with a digital camera (DSC).

For example, the skin evaluation can be performed by analyzing eigenvectors and principal component scores from a spectral image of the applied state of the cosmetic material, storing the eigenvectors and the principal component scores in a recording medium such as a database, and obtaining a spectral reflectance from an RGB image through Winner estimation or the like using, for example, the stored eigenvectors.

Example 1

An example in which an applied state of the cosmetic material on the face of the subject has been actually evaluated using the skin evaluation device will be shown.

In this example, first, a facial skin of a certain subject was captured while changing the amount of application of a foundation or an elapsed time after the application of the foundation in order to acquire a spectral image including wavelengths corresponding to R, G, and B, and a spectral reflectance was obtained. Specifically, images obtained by imaging four samples, that is, (1) skin in which the amount of application of the foundation is 0 mg/cm² (bare skin), (2) skin immediately after the application in which the amount of application of the foundation is 0.05 mg/cm² (thin), (3) skin immediately after the application in which the amount of application of the foundation is 0.8 mg/cm² (thick), and (4) skin after six hours has elapsed from the application in which the amount of application of the foundation is 0.8 mg/cm² (thick) were used for skin evaluation. Further, as the spectral image, a spectral image having 130×174 pixels obtained by dividing an original image of 1040×1392 pixels in eight in both of vertical and horizontal directions was used.

Figure 3A:
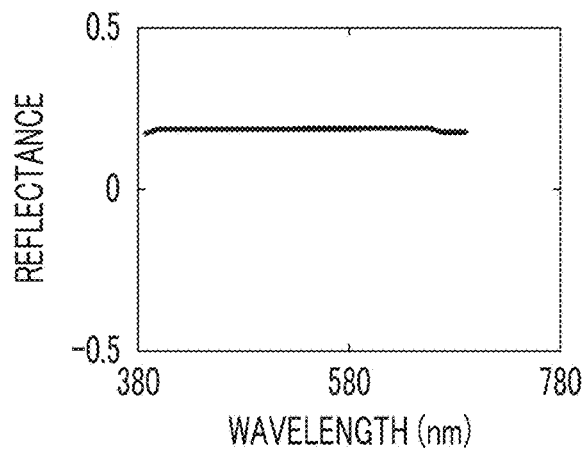
FIG. 3A illustrates an eigenvector of a first principal component according to Example 1.
Figure 3B:
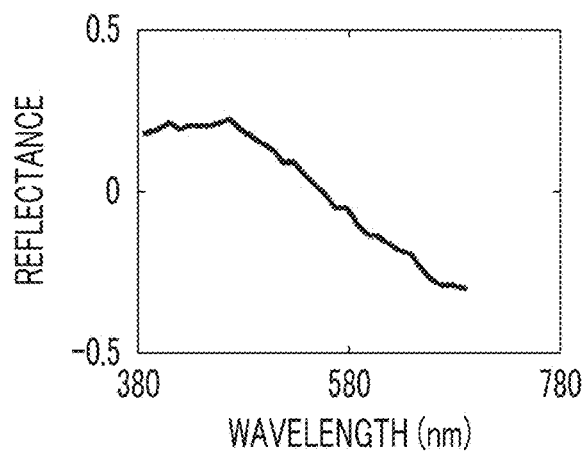
FIG. 3B illustrates an eigenvector of a second principal component according to Example 1.
Figure 3C:
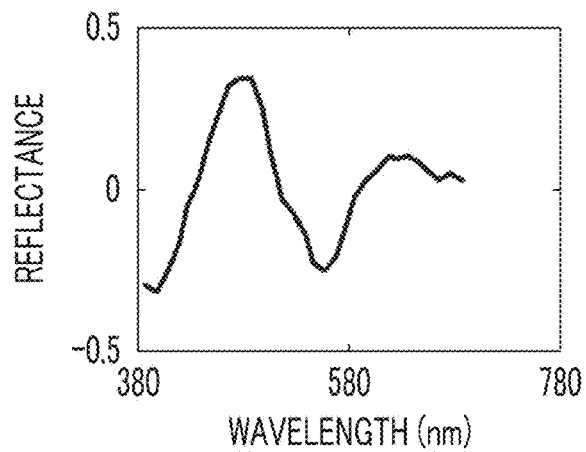
FIG. 3C illustrates an eigenvector of a third principal component according to Example 1.

Principal component analysis was performed on the spectral reflectances of the above (1) to (4). FIG. 3 illustrates eigenvectors related to the first to third principal components. FIG. 3A illustrates a first eigenvector related to the first principal component, FIG. 3B illustrates a second eigenvector related to the second principal component, and FIG. 3C illustrates a third eigenvector related to the third principal component. In FIGS. 3A to 3C, a vertical axis represents a reflectance and a horizontal axis represents a wavelength (380 nm to 780 nm).

Here, the calculated second eigenvector of the second principal component has a reflectance difference between a short wavelength band and a long wavelength band, and in the present embodiment, the calculated second eigenvector has the reflectance difference of about 0.4%. The third eigenvector of the third principal component has a reflectance difference between a reflectance near the central wavelength of 550 nm and a reflectance near a central wavelength of 500 nm and between the reflectance near the central wavelength of 550 nm and a reflectance near a central wavelength of 600 nm, and in this embodiment, the third eigenvector has a reflectance difference of about 0.5%.

Figure 4:
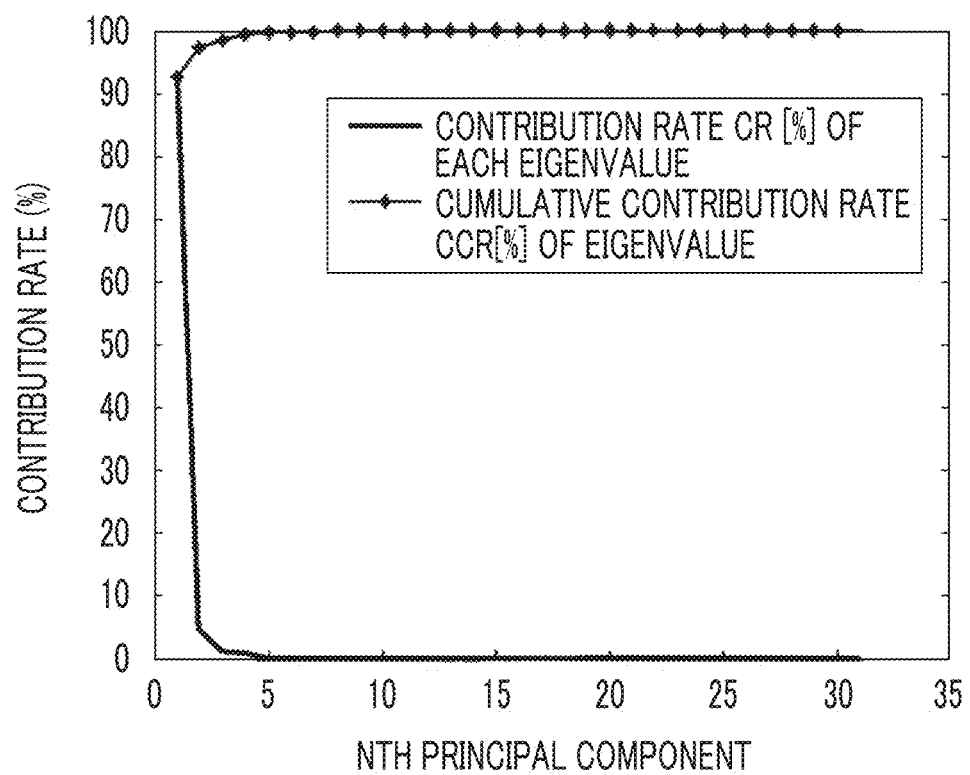
FIG. 4 is a graph illustrating a contribution rate and a cumulative contribution rate of eigenvalues of respective principal components calculated by principal component analysis.

Further, FIG. 4 illustrates a contribution rate of each eigenvalue and a cumulative contribution rate of an eigenvalue of each of principal components including the first to third principal components. In FIG. 4, a vertical axis represents the contribution rate (%), and a horizontal axis represents the number of principal components (a Nth principal component).

As illustrated in FIG. 4, since the cumulative contribution rate is 99.5% in the first to third principal components, it can be seen that the spectral reflectance of the skin can be sufficiently reproduced with three principal components.

Figure 5A:
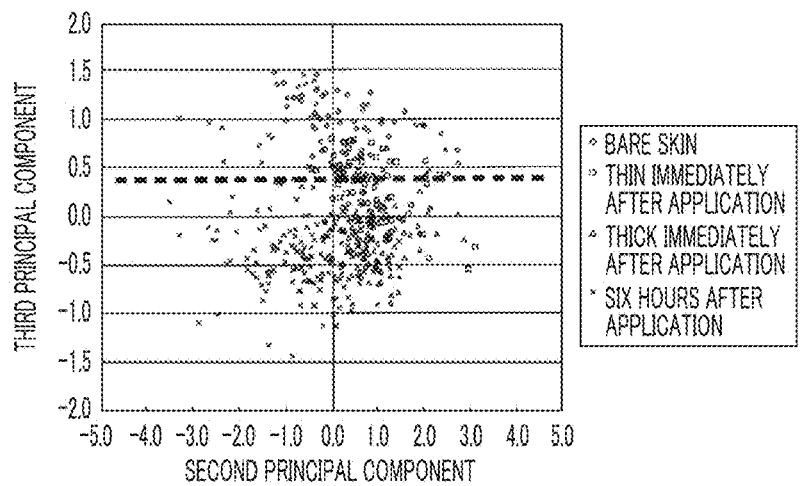
FIGS. 5A to 5C are diagrams in which principal component scores of the second principal component and the third principal component are plotted.
Figure 5B:
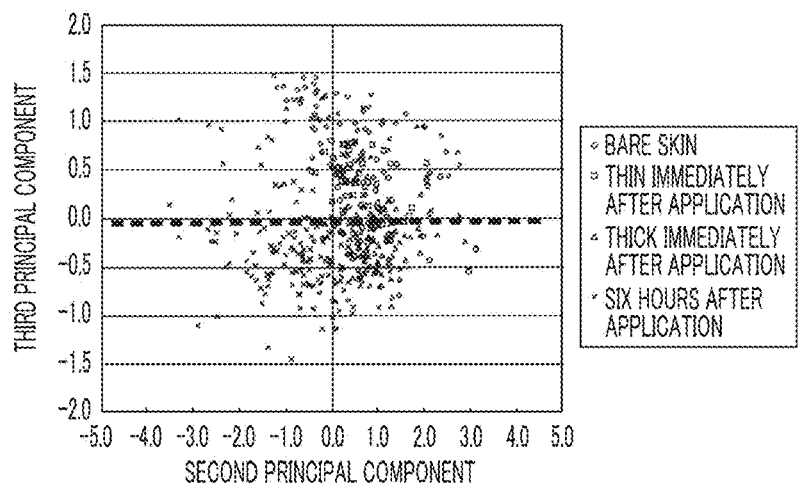
Figure 5C:
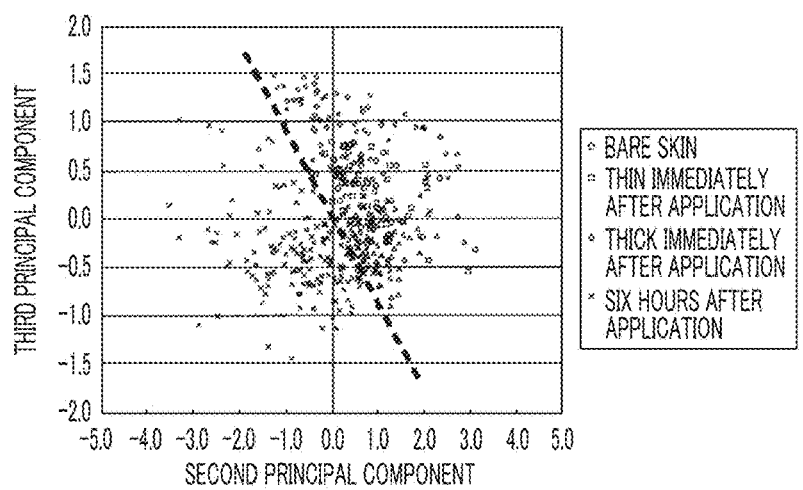

In FIGS. 5A to 5C, respective principal component scores obtained on the basis of the eigenvectors of the second principal component and the third principal component illustrated in FIGS. 3B and 3C are plotted.

It can be seen from FIG. 5A that a mark ◇ indicating that the amount of application of the foundation of sample (1) is 0 mg/cm² (bare skin) is plotted in an area in which 90% or more of the principal component scores of the third principal component is higher than 0.45 and which is indicated by a broken line.

Accordingly, it can be confirmed that separation between the bare skin and the skin with applied makeup can be evaluated on the basis of a distribution of the principal component scores of the third principal component.

It can be seen from FIG. 5B that a mark ☐ indicating that the amount of application of the foundation of sample (2) is 0.05 mg/cm² (thin) is mainly plotted in an area in which the third principal component score is higher than −0.08, and a mark Δ indicating that the amount of application of the foundation of sample (3) is 1.0 mg/cm² (thick) is mainly plotted in an area in which the third principal component score is lower than −0.08 and which is indicated by a broken line.

Accordingly, it can be seen that the amount of application of the cosmetic material can be predicted on the basis of a distribution of the principal component scores of the third principal component.

It can be seen from FIG. 5C that a mark Δ indicating the skin immediately after application in which the amount of application of the foundation of the sample (3) is 0.8 mg/cm² (thick) is mainly plotted in an area on the right side of a graph of a correlation function between the second principal component and the third principal component, and a mark x indicating the skin after six hours has elapsed from the application in which the amount of application of the foundation of the sample (4) is 0.8 mg/cm² (thick) is mainly plotted in an area on the left side of the graph and which is indicated by a broken line.

Accordingly, it can be seen that how much time has elapsed after the foundation is applied can be predicted on the basis of a distribution of the principal component scores of the second principal component and the third principal component.

Figure 6:
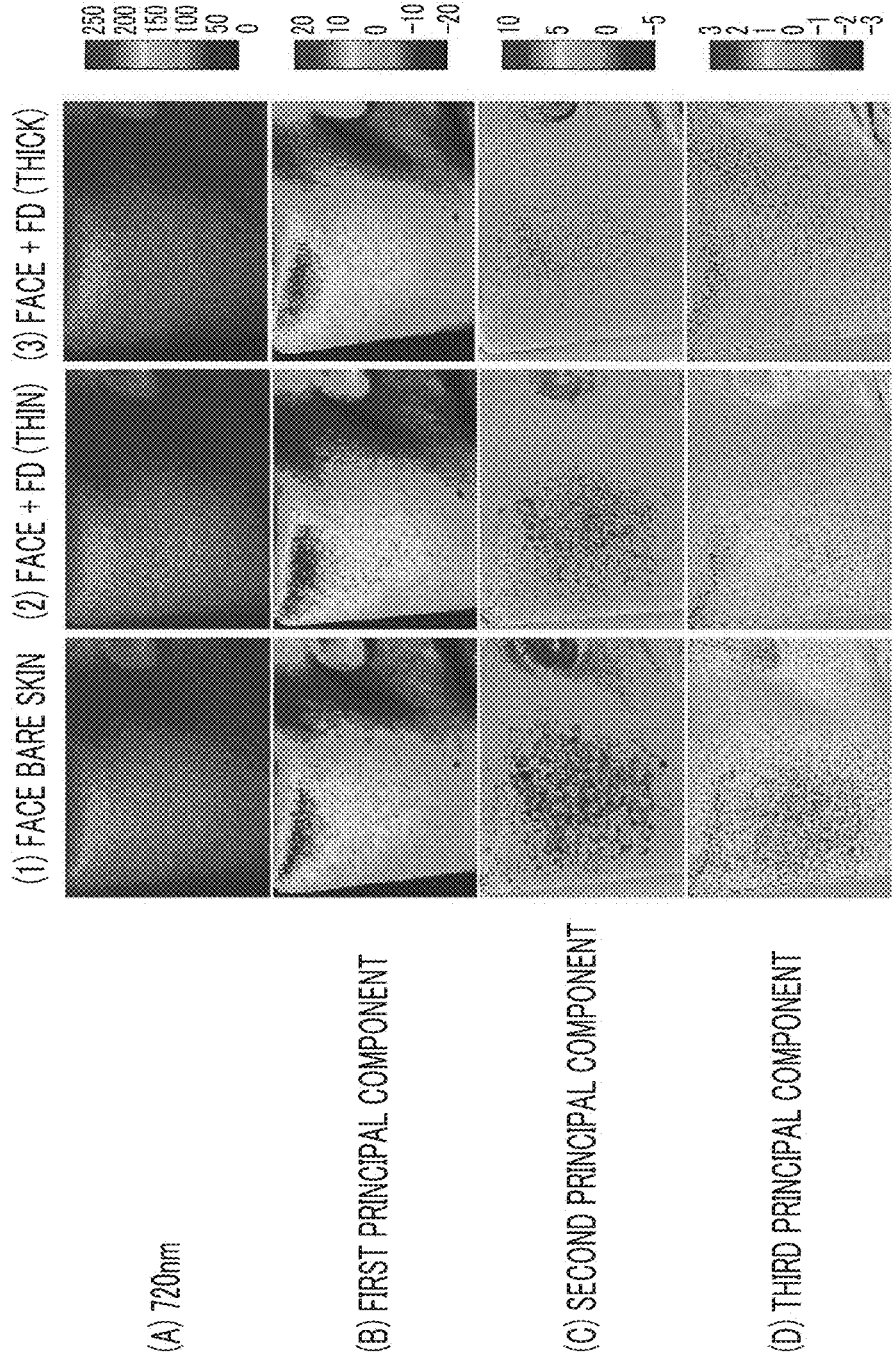
FIG. 6 illustrates an image in which first to third principal components and a wavelength portion of 720 nm are extracted from a spectral image obtained by imaging a face of bare skin of a subject and faces with different amounts of foundation applied on the subject.

In image groups of (A) to (D) in FIG. 6, images of 720 nm, and the first to third principal components from the spectral image obtained by imaging the facial skin (facial skin in which the amount of application of foundation (FD) is at a third level) in the samples (1) to (3) are arranged.

Figure 7:
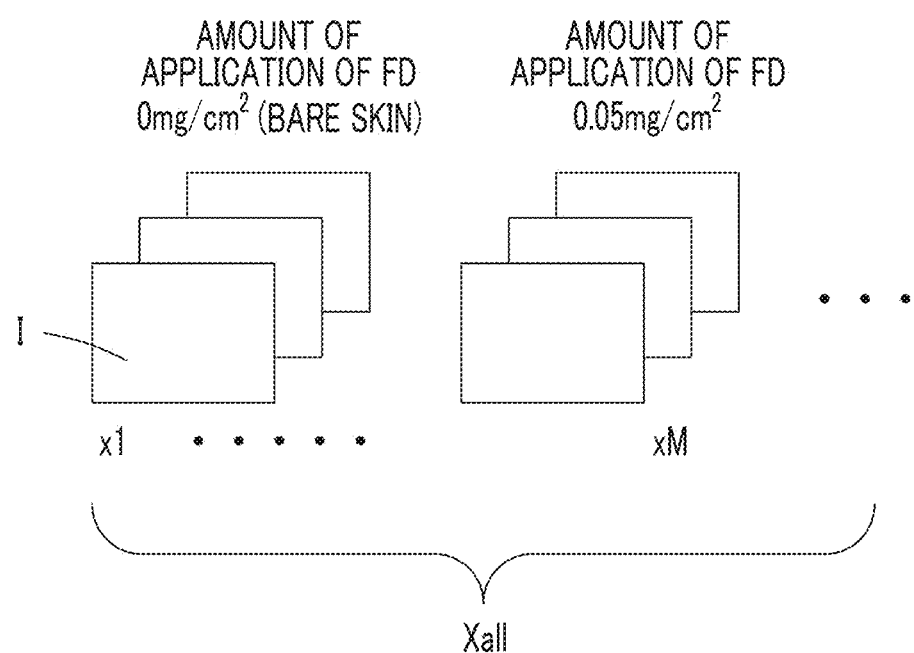
FIG. 7 is a diagram illustrating a method of acquiring images of the first to third principal components of FIG. 6.

Hereinafter, a method of acquiring images of the first to third principal components will be described with reference to FIG. 7.

First, an eigenvector of each principal component is calculated using the following method. Here, a spectral image (a reflection spectrum captured at intervals of 10 nm in the visible light region of 380 nm to 780 nm) I in which the amount of application of foundation (FD) is at a certain level, that is, a spectral image I of any one of samples (1) to (4) in the present example is represented by an M-dimensional (M=wavelength number) vector xi in which the spectral reflectances at the same pixel position on the image at respective wavelengths are arranged, and xi indicates the spectral reflectance at a pixel position on the image at a certain wavelength in the spectral image in which the amount of application of foundation (FD) is at a certain level. "M" in the figure indicates a maximum value of i.

First, an average value μall shown in Equation 2 and a covariance matrix Call shown in Equation 3 are obtained from the spectral images (x1 to xi to xM) at all levels shown in Equation 1, that is, the spectral image Xall of samples (1) to (4) in the present example, and eigenvalue λj and eigenvector vj are calculated by solving an eigenvalue problem of this covariance matrix, that is, Equation 4. When the eigenvalue problem is solved, it is assumed that eigenvectors are sorted in descending order of eigenvalues, and "j" is numbered as 1, 2, 3 . . . . Further, it is assumed that the eigenvectors corresponding to the maximum eigenvalue are the first principal component, and in the order the second principal component, and the third principal component. Since each eigenvector is an M-dimensional vector, a pixel array is restored through a process reverse to the method of representing the spectral image I using the M-dimensional vector, and an image of each principal component is generated.

Further, a principal component score of each principal component is calculated on the basis of the eigenvector of each principal component.

[Equation 1]
$$X_{all} = \{\vec{x}_1, \ldots, \vec{x}_i, \ldots, \vec{x}_M\} \quad (I)$$

[Equation 2]
$$\vec{\mu}_{all} = \frac{1}{M}\sum_{i=1}^{M}\vec{x}_j \quad (II)$$

[Equation 3]
$$C_{all} = \frac{1}{M}\sum_{i=1}^{M}\sum_{j=1}^{M}(\vec{\mu} - \vec{x}_i)(\vec{\mu} - \vec{x}_j)^T \quad (III)$$

[Equation 4]
$$C_{all}\vec{v} = \lambda\vec{v} \quad (IV)$$

The newly captured spectral image I is also created using the eigenvector calculated through normalization similar to the above-described method, and the principal component score of each principal component is calculated through multiplication by a projection vector W shown in Equation 5.

In FIG. 6, a maximum value of the principal component score calculated in this way is visualized as red, and a minimum value is visualized as blue.

[Equation 5]
$$W=[C_1, C_2, \ldots, C_L] \quad (V)$$

Here, L represents an arbitrary positive value, and in the present embodiment, L=4.

A change according to the amount of application of the cosmetic materials cannot be confirmed from the image groups (A) to (C) related to 720 nm, the first principal component and the second principal component in FIG. 6, whereas it can be seen that in the image group (D) related to the third principal component, a blue portion indicating the foundation gradually increases and densely changes as the amount of application of the foundation increases. Thus, it can be seen from the image that the amount of application of the cosmetic material can be evaluated from the principal component score of the third principal component.

Example 3

In this example, first, a spectral image obtained by imaging an arm of a certain subject with variously changing the amount of application of foundation was acquired, and a spectral reflectance was obtained. Specifically, images obtained by imaging four samples, that is, (5) skin in which the amount of application of the foundation is 0 mg/cm² (bare skin), (6) skin in which the amount of application of the foundation is 0.05 mg/cm² (thin), (7) skin in which the amount of application of the foundation is 0.4 mg/cm² (normal), and (8) skin in which the amount of application of the foundation is 0.8 mg/cm² (thick) were used.

Figure 8:
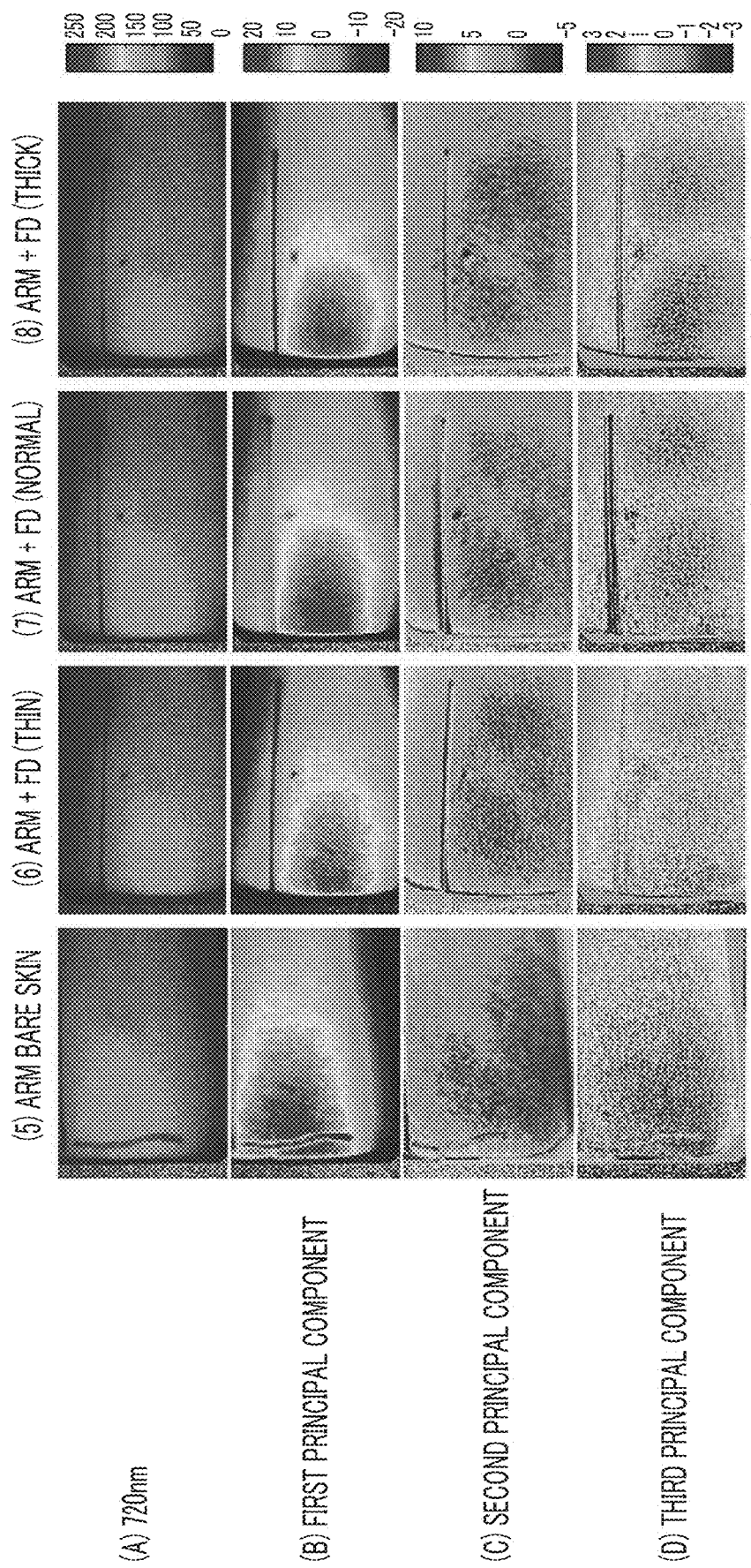
FIG. 8 illustrates an image in which first to third principal components and a wavelength portion of 720 nm are extracted from a spectral image obtained by imaging an arm of bare skin of a subject and arms in which the amounts of application of a foundation are different.

The image groups (A) to (D) in FIG. 8 are image groups obtained by arranging images obtained by extracting only wavelengths related to 720 nm, and the first to third principal components from the spectral image of the arm skin of the samples (5) to (8). The image groups (A) to (D) in FIG. 8 were obtained in the same method as in Example 2.

A change according to the amount of application of the cosmetic material cannot be confirmed from the image groups (A) to (C) related to 720 nm, the first principal component and the second principal component in FIG. 8, whereas it can be seen that in the image group (D) related to the third principal component, a blue portion indicating the foundation gradually increases and densely changes as the amount of application of the foundation increases. Thus, it can be seen from the image that the amount of application of the cosmetic material can be estimated from the principal component score of the third principal component.

Figure 9:
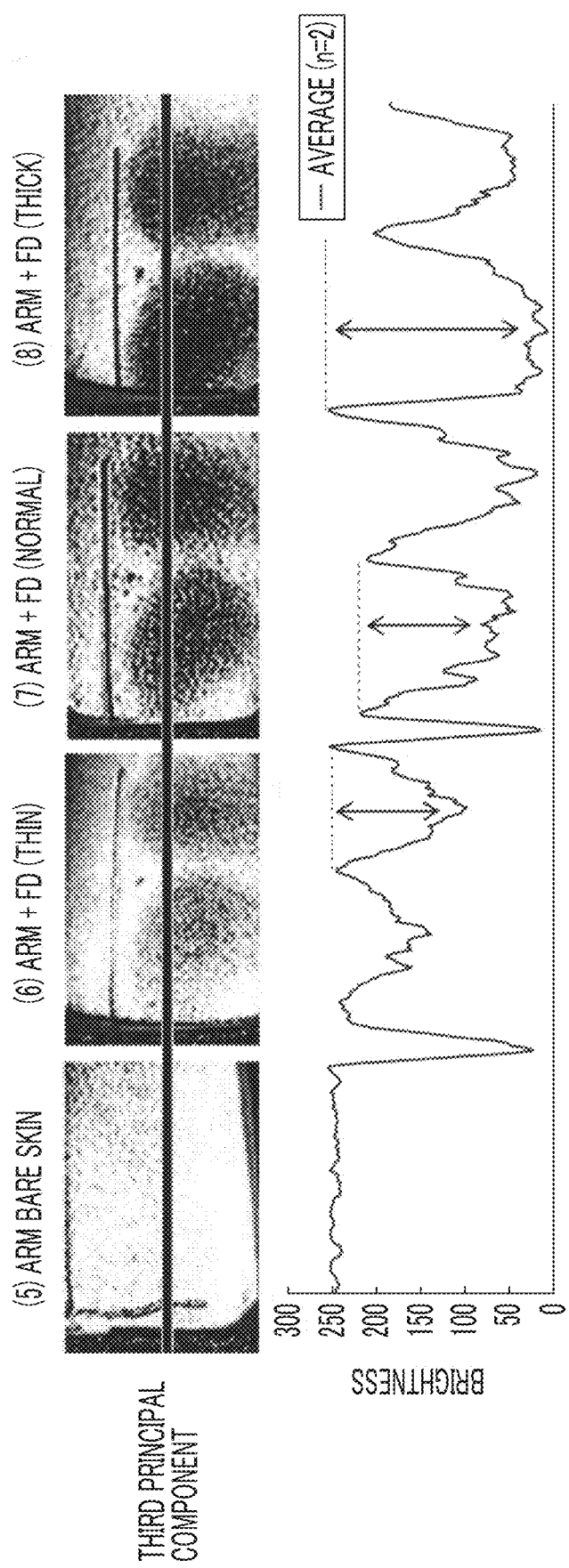
FIG. 9 is a diagram illustrating an image in which the third principal component in FIG. 7 is extracted and a brightness profile corresponding to each image.

FIG. 9 is a diagram illustrating image groups extracted from the third principal component illustrated in (D) part of FIG. 8, and a brightness profile of the image groups.

The brightness profile illustrated herein is obtained by first creating an image obtained by converting the spectral image according to the principal component scores 3 to −3 of the image in (D) part of FIG. 8 into 256 gradations, calculating two brightness profiles of the image converted into 256 gradations for a black line portion in (D) part of FIG. 8, which is illustrated in FIG. 9, and calculating an average value of the two brightness values at respective pixel positions.

In FIG. 9, there is no change in the brightness in the bare skin of the sample (5), whereas a clear difference in brightness between a bare skin portion and a foundation applied portion was confirmed as indicated by an arrow in the figure in the skin to which the foundation has been applied in samples (6) to (8).

Figure 10:
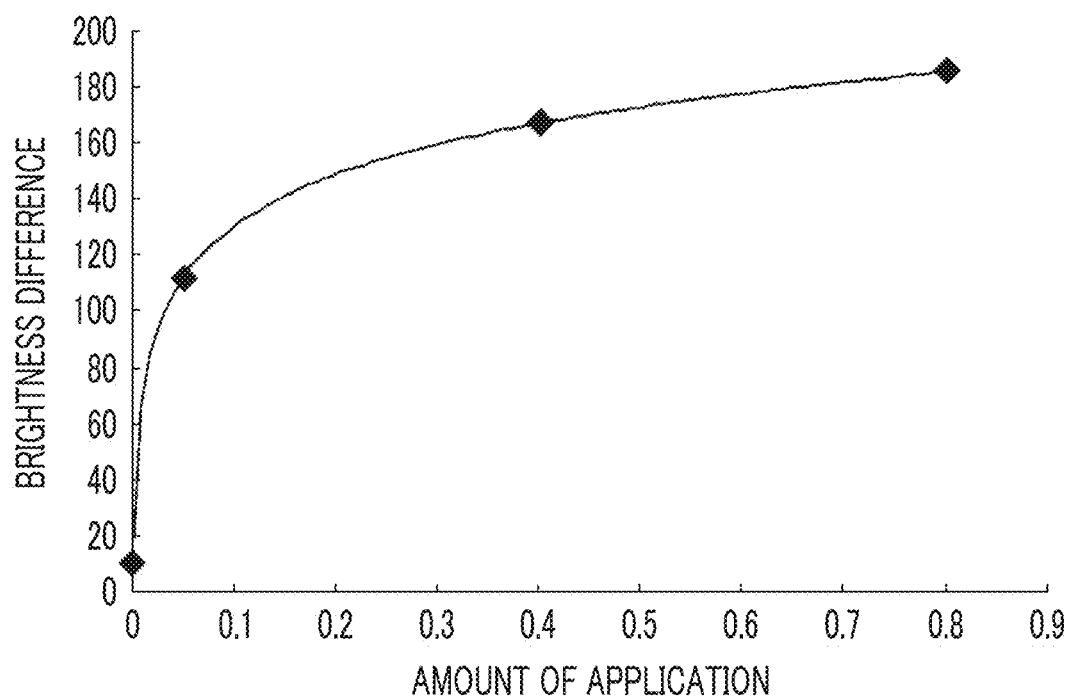
FIG. 10 is a graph illustrating a correlation between a difference in brightness and amounts of application.

Further, FIG. 10 is a graph (y=25.887 Ln(x)+188.47, and a correlation coefficient $R^2$=0.9999) showing a correlation between the amount of application of the foundation of each sample and the difference in brightness between the foundation applied portion and the foundation unapplied portion calculated on the basis of FIG. 9. According to the graph of FIG. 10, it can be seen that the larger the difference in brightness, the larger the amount of application of the foundation becomes.

Accordingly, it was confirmed that the amount of application of the cosmetic material can be estimated on the basis of the principal component score of the third principal component.

In the present invention, a result acquired by performing principal component analysis on the difference in the amount of application of the cosmetic material to one subject, that is, an eigenvector, a threshold value, and a discriminant function may be stored in a database as data. Further, data of a plurality of subjects may be stored in the database, an eigenvector, a threshold, and a discriminant function in a designated specific subject may be called, and analysis may be performed. Further, eigenvectors, threshold values, and discriminant functions obtained by simultaneously performing principal component analysis on applied states of the cosmetic material in a plurality of subjects may be stored in the database. Further, a state of skin of other subjects may be evaluated using the data stored in the database in this way as typical reference data.

Further, in the skin evaluation device, calculating the spectral reflectance by measuring the spectral reflectance from at least a portion of the spectral image obtained by imaging the skin of the subject may not be performed, or the spectral reflectance may be acquired directly from, for example, a database or a memory that stores at least one of spectral reflectance data calculated from at least a portion of the spectral image obtained by imaging the skin of the subject, and spectral reflectance data acquired by measuring the skin of the subject using a measuring instrument capable of acquiring the spectral reflectance. The principal component analysis may be performed on the acquired spectral reflectance to calculate the eigenvectors of the first to third principal components and the principal component scores of the first to third principal components based on the eigenvectors of the first to third principal components, and the applied state of the cosmetic material in the skin may be evaluated using at least one of the calculated principal component scores of the first to third principal components and a preset threshold value or discriminant function of each principal component.

EXPLANATION OF REFERENCES

1: image input unit
2: preprocessing unit
3: spectral reflectance measurement unit
4: principal component analysis unit
5: skin evaluation unit
6: display unit
7: database
8: control unit
9: operation unit
F: face
C: camera

What is claimed is:
1. A skin evaluation device, comprising:
an image input unit that receives a spectral image obtained by imaging skin of a subject;
a spectral reflectance calculation unit that measures a spectral reflectance from at least a portion of the spectral image;
a principal component analysis unit that performs principal component analysis on the spectral reflectance and calculates eigenvectors of first to third principal components and principal component scores of the first to third principal components based on the eigenvectors of the first to third principal components; and
a skin evaluation unit that evaluates an applied state of a cosmetic material in the skin using at least one of the calculated principal component scores of the first to third principal components and a preset threshold value or discriminant function of each principal component,
wherein the eigenvector of the first principal component represents brightness of the skin,
wherein the eigenvector of the second principal component has a reflectance difference between a short wavelength band and a long wavelength band, and
wherein the eigenvector of the third principal component has a reflectance difference between a reflectance near a central wavelength of 550 nm and a reflectance near a central wavelength of 500 nm and between the reflectance near the central wavelength of 550 nm and a reflectance near a central wavelength of 600 nm.
2. The skin evaluation device according to claim 1,
wherein the skin evaluation unit evaluates whether the skin is bare skin or in a state in which a cosmetic material is applied using the principal component score of the third principal component calculated by the principal component analysis unit and the preset threshold value or discriminant function of the third principal component.
3. The skin evaluation device according to claim 1,
wherein the skin evaluation unit evaluates the amount of application of the cosmetic material using the principal component score of the third principal component calculated by the principal component analysis unit and the preset threshold value or discriminant function of the third principal component.

4. The skin evaluation device according to claim 1,
wherein the skin evaluation unit evaluates an elapsed time after the cosmetic material is applied to the bare skin using the principal component scores of the second and third principal components and the preset threshold values or discriminant functions of the second and third principal components.

5. The skin evaluation device according to claim 1, further comprising:
a database that stores the eigenvectors of the first to third principal components calculated by the principal component analysis unit,
wherein the principal component analysis unit calculates principal component scores of the first to third principal components by referring to the eigenvectors of the first to third principal components stored in the database.

6. The skin evaluation device according to claim 5,
wherein the database stores the preset threshold values or discriminant functions of the first to third principal components, and
the skin evaluation unit evaluates an applied state of the cosmetic material in the skin using at least one of the principal component scores of the first to third principal components calculated by the principal component analysis unit and the preset threshold values or discriminant functions of the first to third principal components stored in the database.

7. A skin evaluation method, comprising:
receiving a spectral image obtained by imaging skin of a subject;
measuring a spectral reflectance from at least a portion of the spectral image;
performing principal component analysis on the spectral reflectance and calculating eigenvectors of first to third principal components and principal component scores of the first to third principal components based on the eigenvectors of the first to third principal components; and
evaluating an applied state of a cosmetic material in the skin using at least one of the calculated principal component scores of the first to third principal components and a preset threshold value or discriminant function of each principal component,
wherein the eigenvector of the first principal component represents brightness of the skin,
wherein the eigenvector of the second principal component has a reflectance difference between a short wavelength band and a long wavelength band, and
wherein the eigenvector of the third principal component has a reflectance difference between a reflectance near a central wavelength of 550 nm and a reflectance near a central wavelength of 500 nm and between the reflectance near the central wavelength of 550 nm and a reflectance near a central wavelength of 600 nm.

8. A non-transitory computer readable recording medium storing a skin evaluation program for causing a computer to execute the steps of:
receiving a spectral image obtained by imaging skin of a subject;
measuring a spectral reflectance from at least a portion of the spectral image;
performing principal component analysis on the spectral reflectance and calculating eigenvectors of first to third principal components and principal component scores of the first to third principal components based on the eigenvectors of the first to third principal components; and
evaluating an applied state of a cosmetic material in the skin using at least one of the calculated principal component scores of the first to third principal components and a preset threshold value or discriminant function of each principal component,
wherein the eigenvector of the first principal component represents brightness of the skin,
wherein the eigenvector of the second principal component has a reflectance difference between a short wavelength band and a long wavelength band, and
wherein the eigenvector of the third principal component has a reflectance difference between a reflectance near a central wavelength of 550 nm and a reflectance near a central wavelength of 500 nm and between the reflectance near the central wavelength of 550 nm and a reflectance near a central wavelength of 600 nm.

* * * * *